(12) United States Patent
Baechle et al.

(10) Patent No.: US 10,855,215 B2
(45) Date of Patent: Dec. 1, 2020

(54) POWER GENERATION SYSTEM TECHNICAL FIELD

(71) Applicant: ABB Schweiz AG, Baden (CH)

(72) Inventors: Matthias Baechle, Eggingen (DE); Rudolf Wieser, Graz (AT); Peter Al-Hokayem, Nussbaumen (CH); Eduardo Rohr, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/659,144

(22) Filed: Oct. 21, 2019

(65) Prior Publication Data
US 2020/0052629 A1  Feb. 13, 2020

Related U.S. Application Data

(63) Continuation of application No. PCT/EP2018/060216, filed on Apr. 20, 2018.

(30) Foreign Application Priority Data

Apr. 20, 2017 (EP) .................................... 17167363

(51) Int. Cl.
*H02P 9/14* (2006.01)
*F01D 15/10* (2006.01)
(Continued)

(52) U.S. Cl.
CPC ................ *H02P 9/14* (2013.01); *F01D 15/10* (2013.01); *H02J 1/102* (2013.01); *H02J 3/381* (2013.01);
(Continued)

(58) Field of Classification Search
CPC .. H02P 9/14; H02P 9/007; F01D 15/10; H02J 1/102; H02J 3/381; H02J 3/46
See application file for complete search history.

(56) References Cited

U.S. PATENT DOCUMENTS 6,275,012 B1 *  8/2001  Jabaji ..................... H02K 19/34
                                                    322/22
2010/0096932 A1 *  4/2010  Nikolov ................... H02P 9/02
                                                    307/81
(Continued)

FOREIGN PATENT DOCUMENTS

CN        102185550 A      9/2011
WO     2014032668 A1      3/2014
WO     2016156636 A1     10/2016

OTHER PUBLICATIONS

European Patent Office, International Search Report & Written Opinion issued in corresponding Application No. PCT/EP2018/060216, dated Aug. 3, 2018, 10 pp.
(Continued)

*Primary Examiner* — Viet P Nguyen
(74) *Attorney, Agent, or Firm* — Taft Stettinus & Hollister LLP; J. Bruce Schelkopf

(57) ABSTRACT

The application relates to a power generation system, including a synchronous generator for converting mechanical power into electrical power at an output side configured for connecting an AC power grid, a first rectifier and a second rectifier each having an AC side connected to the output side of the generator and a DC side, an exciter configured for exciting the, and a selector device having an input side and an output side, the input side connected to the DC side of the first rectifier and to the DC side of the second rectifier and the output side connected to the exciter, the selector device is configured for switching the DC sides in series or in parallel or for transmitting DC power from the first rectifier and the second rectifier corresponding to an arbitrary split ratio to the output side.

20 Claims, 5 Drawing Sheets

(51) Int. Cl.
*H02J 1/10* (2006.01)
*H02J 3/38* (2006.01)
*H02J 3/46* (2006.01)
*H02P 9/00* (2006.01)

(52) U.S. Cl.
CPC ............... *H02J 3/46* (2013.01); *H02P 9/007* (2013.01); *F05D 2220/7642* (2013.01)

(56) References Cited

U.S. PATENT DOCUMENTS

| | | | | |
|---|---|---|---|---|
| 2010/0295517 | A1* | 11/2010 | Rozman | H02P 9/34 |
| | | | | 322/57 |
| 2011/0273147 | A1* | 11/2011 | Hall | H02P 25/18 |
| | | | | 322/28 |
| 2013/0229056 | A1 | 9/2013 | Teichmann | |
| 2015/0108761 | A1 | 4/2015 | Bala et al. | |
| 2015/0124496 | A1 | 5/2015 | Yu et al. | |
| 2015/0263526 | A1* | 9/2015 | Kjær | H02J 5/00 |
| | | | | 290/44 |
| 2015/0349655 | A1* | 12/2015 | Petersen | H02M 7/08 |
| | | | | 363/35 |
| 2017/0225798 | A1* | 8/2017 | Guillot | B64D 41/00 |

OTHER PUBLICATIONS

European Patent Office, Extended Search Report issued in corresponding Application No. 17167363.5, dated Oct. 27, 2017, 6 pp.

* cited by examiner

POWER GENERATION SYSTEM

TECHNICAL FIELD

The invention relates to a power generation system comprising a synchronous generator for converting mechanical power into electrical power and comprising a field winding, a step-up transformer connected to the generator and configured for connecting an AC power grid such that the step-up transformer is connected in series between the generator and the grid, and an exciter configured for exciting the generator by feeding the field winding DC power.

BACKGROUND ART

Synchronous generators are a major source of commercial electrical energy and are commonly used to convert mechanical power output of steam turbines, gas turbines, reciprocating engines or hydro turbines into electrical power feeding a grid. Synchronous generators usually comprise a rotor arranged in a centre of the generator containing a magnet, whereby a stator is electrically connected to a load such as the grid. The magnet generates a magnetic field which leads the rotor and thus the magnetic field to rotate with the same speed thereby inducing current into a stationary armature. Often, the synchronous is connected to the grid via a step-up transformer and a field winding of the generator is fed via an exciter. A governor controls the mechanical power of a primary mover that rotates the rotor of the generator, which in turn is supplied with DC field current. The exciter typically extracts AC power received from the grid through a step-down transformer and provides DC power to the field winding of the synchronous generator.

In normal operating conditions, the voltage at the armature/stator is one per unit. However, the grid may experience a variety of single or multiple line-to-line or line-to-ground faults that result in a large drop of the voltage at the terminals. When this drop occurs at the terminals of the generator, it effects the voltage at an input of the step-down transformer and results in a power drop at output terminals of the exciter that feeds the field winding of the synchronous generator. If such fault lasts for a relatively long period the generator may fall out of synchrony and the power plant comprising the generator is shutdown resulting in large-scale ripple on the grid and large financial losses.

Document WO 2014/032668 A1 describes a connection system for connecting a power generator to a DC electrical power system. A first rectifier is connected in parallel to a second rectifier. The first rectifier or the second rectifier will rectify only if a voltage exceeds an AC equivalent of a DC-link voltage.

Document CN 102185550 A shows a wind turbine connected to a power grid. An exciter has an excitation winding that is excited by an excitation controller having a dedicated energy source.

SUMMARY OF INVENTION

It is therefore an object of the invention to provide a power generation system and a respective method for extending an operation duration of a power plant grid fault.

The object of the invention is solved by the features of the independent claims. Preferred embodiments are described in the dependent claims.

Thus, the object is solved by a power generation system comprising a synchronous generator for converting mechanical power into electrical power provided at an output side configured for connecting an AC power grid, at least two rectifiers including a first rectifier and a second rectifier each having an AC side connected to the step-up transformer and a DC side, an exciter configured for exciting the generator, and a selector device having an input side and an output side, the input side connected to the DC sides of the at least two rectifiers and the output side connected to the exciter, whereby the selector device is configured for switching the DC side in series or in parallel or for transmitting power from the at least two rectifiers corresponding to an arbitrary split ratio to the output side.

A key point of the invention is therefore that the power generation system is able to increase the voltage available to the exciter by, for example, switching the DC sides in series thereby doubling the voltage, without requiring a second source of electrical power such as batteries or capacitors. In other words, the power generation system allows for dynamically reconfiguring the topology of an excitation system comprising the first rectifier, the second rectifier, the exciter and the selector device online during a voltage drop at terminals of the generator, i.e. during a so-called low voltage ride through, LVRT. Thus, the power generation system can increase the excitation system voltage capabilities during severe voltage dips in the grid due to varies types of faults, thereby ensuring that the excitation system complies with grid code requirements.

During normal operation conditions the DC sides as outputs of the first rectifier and the second rectifier can be connected in parallel. During LVRT conditions the selector device may connect the outputs of the first rectifier and a second rectifier in series thereby increasing a total output voltage available for the field winding via the exciter. Having at least two rectifiers, i.e. the first rectifier and the second rectifier allows for a redundant operation and resulting in significantly reduced cost and space required, when comparing to prior art solutions requiring a second source of electrical power. The proposed solution has the further advantage that existing installations can be easily upgraded as the additional hardware required for the second rectifier and the exciter only requires low volume.

In sum, the power generation system is characterized by a great flexibility in designing a step-up transformer and the rectifiers for continuous operation, for example in case of redundant operation, or for short-time operation, for example in case only a voltage increase during LVRT is desired. The proposed excitation system can be applied for direct excitation systems as well as for indirect excitation systems, with or without an external source. For example, an extra cabinet may be attached to an existing excitation system that provides an extra voltage boost by switching the DC sides of the rectifiers in parallel during faults, while being on standby during normal operation conditions. Besides that the proposed solution is very attractive for retrofit scenarios, while it also allows reducing cases in which an existing excitation system is over-sized in order to handle longer periods of ride through conditions.

The synchronous generator can be provided as any synchronous generator known from prior art, for example as a permanent magnet generator, whereby a magnetic field of a rotor is produced by permanent magnets. Other suitable types of generators may use electromagnets to produce a magnetic field in a rotor winding, whereby direct current in a rotor field winding is provided by a brushless exciter on the same shaft. The step-up transformer is preferably provided as a transformer known from prior art, preferably as a so-called medium voltage, MV, power transformer. The AC grid has, for example, a voltage of 110 kV.

Transmitting power from the first rectifier and the second rectifier corresponding to an arbitrary split ratio to the output side may involve adjusting an operational setpoint of the first rectifier relative to an operational setpoint of the second rectifier according to the split ratio. In an exemplary case of thyristor-based rectifiers, such as thyristor bridge rectifiers, the respective operational setpoint can be adjusted by adjusting the firing angle of the corresponding rectifier. A firing angle is typically referred to a cycle of the voltage or the current on the AC side of the rectifier. For example, the firing angle of the first rectifier may be set to provide two parts of a total power to be supplied, and the firing angle of the second rectifier may be set to provide three parts of the total power to be supplied, resulting in a split ratio of 2:3. In the same way, other split ratios can be obtained. Adjusting the operational setpoint, such as the firing angle in the case of a thyristor-based rectifier, can be extended to configurations having more than two rectifiers, i. e. transmitting power from the plurality of rectifiers corresponding to an arbitrary split ratio to the output side may involve adjusting the operations setpoints of the respective rectifiers relative to each other according to the split ratio. As a further example and as an alternative to a configuration including rectifiers each having a thyristor-based configuration, such as thyristor bridge rectifiers, one rectifier may be configured as a voltage source, and one or more further rectifiers may be configured as thyristor bridge rectifiers. The voltage source may be depleted (e. g., switched off) after a predetermined or adjustable amount of time has elapsed, resulting in an arbitrary split ratio corresponding to the amount of time.

Transmitting power from the first rectifier and the second rectifier corresponding to the split ratio to the output side means, for example with a split ratio of 2:3, that two parts of the DC power is supplied by the first rectifier and three parts of the DC power is supplied by the second rectifier to the exciter. In a further embodiment more than two rectifiers are provided, each having an AC side connected to the step-up transformer and the DC side, whereby the input side of the selector device is connected to the DC sides of the rectifiers and the selector device is configured for switching respectively connecting the DC sides of all rectifiers in series or in parallel or for transmitting power from the rectifiers corresponding to a split ratio to the output side. Thus, for example, with three rectifiers the split ratio could be 3:1:1. Generally, the split ratio can be [r1:r2:r3], with where r1, r2 and r3 each could be a real number to make split in power injection (even extraction) possible in an arbitrary way. Splitting the power according to the split ratio is preferably done by respectively controlling the rectifiers, preferably when both rectifiers are connected in series.

According to a preferred embodiment the power generation system comprises a step-up transformer connected to the output side of the generator and configured for connecting the AC power grid such that the step-up transformer is connected in series between the generator and the grid, a first step-down transformer connected in series between the AC sides of the at least two rectifiers and the step-up transformer, a first step-down transformer connected in series between the AC sides of at least one of the at least two rectifiers and the step-up transformer and a second step-down transformer connected in series between the AC side of the at least another one of the at least two rectifiers and a step-up transformer, or a first step-down transformer connected in series between the AC side of at least one of the at least two rectifiers and the step-up transformer and a second step-down transformer connected in series between the AC sides of the at least two rectifiers. The second step-down transformer may have the same input-output voltages and thus being used for galvanic insulation.

With the second alternative as described before, having said two step-down transformers each arranged in series with a respective rectifier and arranged in parallel between the selector device and the step-up transformer means that an individual step-down transformer is provided for each rectifier converter with its primary side connected preferably to the stator/armature of the generator. The third alternative utilizes the first step-down transformer as a main transformer supplying voltage from the stator/armature of the generator to both rectifiers, being supplemented by an additional transformer, i.e. the second step-down transformer arranged between the two rectifiers, whereby said second step-down transformer provides galvanic isolation between the two rectifier converters. Preferably the second step-down transformer in the third alternative comprises a voltage ratio of 1:1, while alternative ratios are possible as well.

According to a further preferred embodiment, the step-down transformer and/or the second step-down transformer is provided as a single transformer with isolated secondary windings, is provided with or without a phase shift scheme and/or comprises a delta-Y connection. It is further preferred that the first step-down transformer and/or the second step-down transformer is connected with its primary side to a stator respectively armature of the generator. In this way the first rectifier and/or the second rectifier can be fed with AC voltage through the first step-down transformer and/or the second step-down transformer connected to the stator respectively armature of the generator.

According to a another preferred embodiment at least one of the at least two rectifiers is provided as thyristor bridge rectifiers, comprise a storage device connected in series with at least one of the at least two rectifiers and/or are galvanically isolated from each other. Preferably, the storage device is provided as a battery or a capacitor.

According to another preferred embodiment at least one of the at least two rectifiers comprise a plurality of three-phase thyristor bridge rectifiers connected in series and/or in parallel. Preferably, the first rectifier and/or the second rectifier comprise a thyristor inverter, a directional diode rectifier or comprises a self-commutating semiconductor device such as an IGBT arranged parallel to a diode rectifier. Besides that the first rectifier and/or the second rectifier can be implemented by using any means known from prior art for rectifying alternating current to direct current, for example as a six pulse diode rectifier.

As described before the first rectifier and the second rectifier are preferably provided as three-phase thyristor bridge rectifiers. In such case, according to another preferred embodiment, each DC side comprises a first line on a first potential and a second line on a second potential, whereby the second potential is lower than the first potential, the selector device comprises a switch arranged between a second line of the first rectifier and the first line of the second rectifier, and the second line of the first rectifier is connected with the second line of the second rectifier to the exciter and the first line of the second rectifier is connected with the first line of the first rectifier to the exciter. The first potential is preferably provided as a positive potential, whereby the second potential is preferably provided as a negative potential.

In such way two thyristor bridges are fed with AC voltage preferably provided through one or more step-down transformers connected to the stator terminals of the generator. During normal operation, the switch is preferably opened and at least one converter, i.e. at least one of the two rectifiers, is in operation to provide DC current via the exciter, for example to a rotor winding or brushlessly. During such normal operation the other converter, i.e. the other rectifier can be either used to share the current, for example for load balancing, or as a backup converter respectively rectifier.

According to a further embodiment in this regard, the selector device comprises a first diode and a second diode, and a second line of the first rectifier is connected via the first diode arranged in blocking direction with the second line of the second rectifier to the exciter and the first line of the second rectifier is connected via the second diode arranged in forward direction with the first line of the first rectifier to the exciter. In such way, when the switch is closed, the first diode and the second diode will go into a blocking state such that the total output voltage available for exciting the generator increases, which is particularly advantageous during a LVRT condition.

In an alternative embodiment in this regard the selector device comprises a first breaker and a second breaker, and the second line of the first rectifier is connected via the first breaker with the second line of the second rectifier to the exciter and the first line of the second rectifier is connected via the second breaker with the first line of the first rectifier to the exciter. Preferably, the first breaker and/or the second breaker are arranged in parallel to the first diode and/or the second diode for bypassing the respective diode. Providing a breaker has the advantage of reducing conduction losses during normal operation.

According to a further preferred embodiment the switch is provided as an electric switch, a mechanical switch, a mechanical breaker, and/or a semiconductor switch, for example comprising an IGBT, thereby allowing an easy and cost-effective implementation.

As briefly outlined before, the generator can be provided in different ways. According to an especially preferred embodiment the generator comprises a main machine and the exciter comprises a field wound or brushless rotor for exciting the main machine. In another preferred embodiment, the synchronous generator comprises a field winding and the exciter is configured for exciting the generator by feeding the field winding with DC power. In an even further preferred embodiment the generator comprises a rotor, a stator and a primary mover rotating the rotor, the step-down transformer is connected to the stator and the power generating system comprises a governor connected to the generator and configured for controlling mechanical power of the primary mover.

In another preferred embodiment the selector device is configured for transmitting or exchanging power from the first rectifier and the second rectifier corresponding to the split ratio to the output side, whereby the split ratio is 1:3, 1:4, 1:5 or 1:6. Besides that the split ratio could be [1:r], where r is a real number to make split in power injection (even extraction) possible in an arbitrary way. This way a load sharing functionality can be implemented by splitting the ratio of DC power provided from the first rectifier and the second rectifier according to the given ratio. For a redundant operation, with a split ratio of 1:1, a magnetic circuit of the first step-down transformer and/or of the second step-down transformer is preferably designed for nominal load conditions.

The object of the invention is further solved by a method of extending operation during a power generation system, comprising a synchronous generator for converting mechanical power into electrical power provided at an output side configured for connecting to an AC power grid, at least two rectifiers including a first rectifier and a second rectifier each having an AC side connected to the step-up transformer and a DC side, an exciter configured for exciting the generator with DC power, and a selector device having an input side and an output side, the input side connected to the DC sides of the at least two rectifiers and the output side connected to the exciter, whereby the method comprises the step: switching, by the selector device, the DC sides in series or in parallel or for transmitting DC power from the at least two rectifiers corresponding to an arbitrary split ratio to the output side.

According to a further preferred embodiment, the method comprises a step-up transformer connected to the generator and configured for connecting to the AC power grid such that the step-up transformer is connected in series between the generator and the grid, a first step-down transformer connected in series between the AC sides and the step-up transformer, a first step-down transformer connected in series between the AC side of at least one of the at least two rectifiers and the step-up transformer and a second step-down transformer connected in series between the AC side of the least another one of the rectifier and the step-up transformer, or a first step-down transformer connected in series between the AC side of at least one of the at least two rectifiers and the step-up transformer and a second step-down transformer connected in series between the AC sides of the at least two rectifiers.

Further embodiments and advantages of the method will be derived by the person skilled in the art in analogy to the power generation system as described above. The method allows for advantageously increasing the voltage available to the exciter without requiring a second source of electrical power such as batteries or capacitors. The first rectifier and the second rectifier can be advantageously used for redundant operation and voltage increase during a low voltage ride through, thereby significantly reducing the cost and space requirements compared to prior art methods.

BRIEF DESCRIPTION OF DRAWINGS

These and other aspects of the invention will be apparent from and elucidated with reference to the embodiments described hereinafter.

In the drawings.

DESCRIPTION OF EMBODIMENTS

Figure 1:
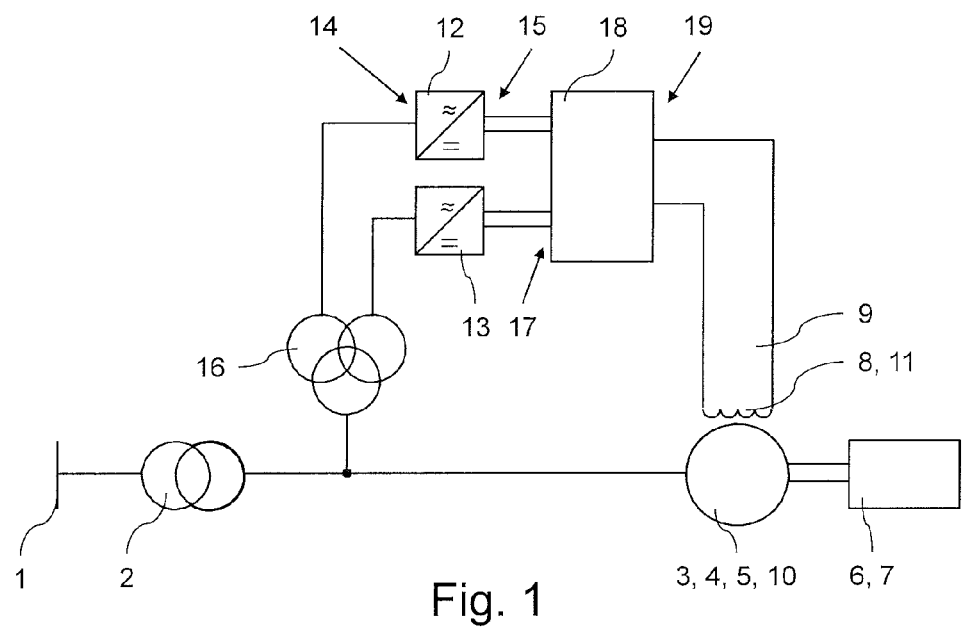
FIG. 1 shows a power generation system according to a preferred embodiment of the invention in a schematic view.
Figure 3:
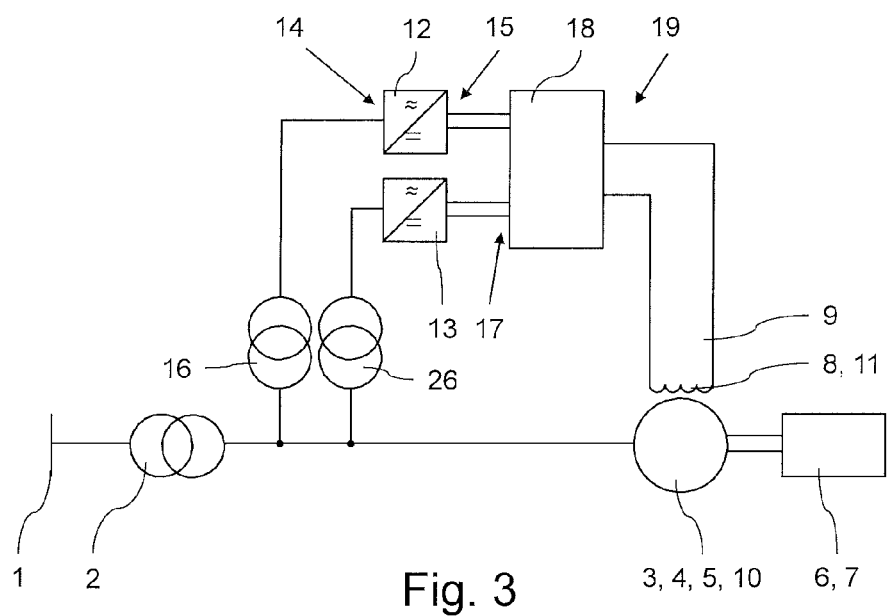
FIG. 3 shows a power generation system according to a further embodiment of the invention in a schematic view.
Figure 4:
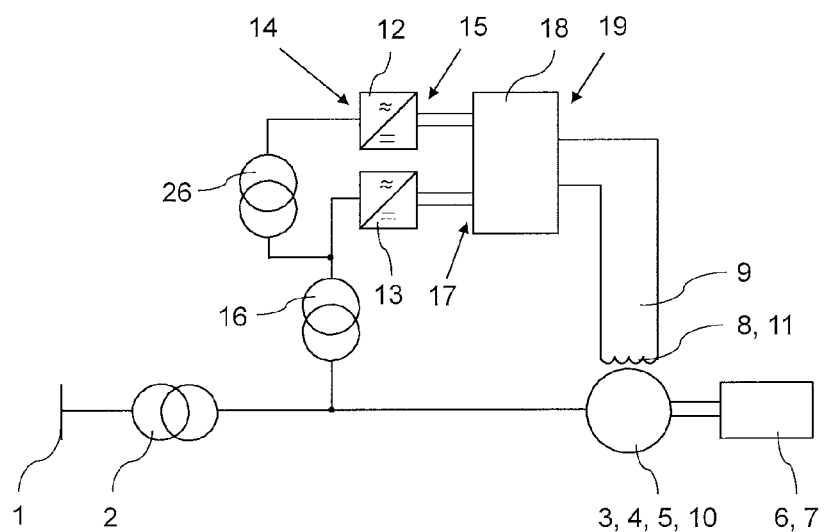
FIG. 4 shows a power generation system according to an even further embodiment of the invention in a schematic view.

FIG. 1, FIGS. 3 and 4 each show a power generation system according to preferred embodiments of the invention in schematic views. An AC power grid 1 is connected via a step-up power transformer 2 to a synchronous generator 3. The generator 3 comprises a rotor 4, a stator 5 and a primary mover 6, which rotates the rotor 4. The step-down transformer 2 is connected to the stator 4. A governor 7 is provided for controlling mechanical power of the primary mover 6. The generator 3 further comprises a field winding 8, which can be fed with DC power by an exciter 9 for exciting the generator 3. Alternatively or in addition the generator 3 comprises a main machine 10 and the exciter 9 comprises a field wound or brushless rotor 11 for exciting the main machine 10.

A first rectifier 12 and a second rectifier 13 are provided each having an AC side 14 and DC side 15. The AC side 14 of the first rectifier 12 and of the second rectifier 13 are connected via a first step-down transformer 16 to the step-up transformer 2 respectively the generator 3. Both DC sides 15 of the first rectifier 12 and of the second rectifier 13 are connected to an input side 17 of a selector device 18. An output side 19 of the selector device 18 is connected to the exciter 9.

The selector device 18, for example provided as a switch, is configured for switching the DC sides 15 in series or in parallel to the output side 19. Furthermore, the selector device 18 is configured for transmitting DC power from the first rectifier 12 and the second rectifier 13 corresponding to a slit ratio to the output side 19. With the split ratio of exemplary 1:2 the DC power provided to the exciter 9 originates a third from the first rectifier 12 and two thirds from the second rectifier 13.

During normal operating conditions, the DC sides of the first rectifier 12 and the second rectifier 13 can be connected in parallel by the selector device 18 such that the exciter 9 is fed with DC power having a certain voltage, for example each 1000 V DC being provided by the first rectifier 12 and a second rectifier 13. However, during a low voltage ride through, LVRT, the selector device 18 can connect the DC sides 15 of the first rectifier 12 and a second rectifier 13 in series, thereby increasing the voltage of the DC power provided to the exciter 9 to 2000 V DC according to the present example. Thus, connecting the DC sides 15 in parallel during a relatively long low voltage ride through prevents the generator 13 to fall out of synchrony and equally prevents a power plant connected to the generator 13 to shutdown resulting in a large-skill ripple on the grid 1 and respective large financial losses.

Figure 2:
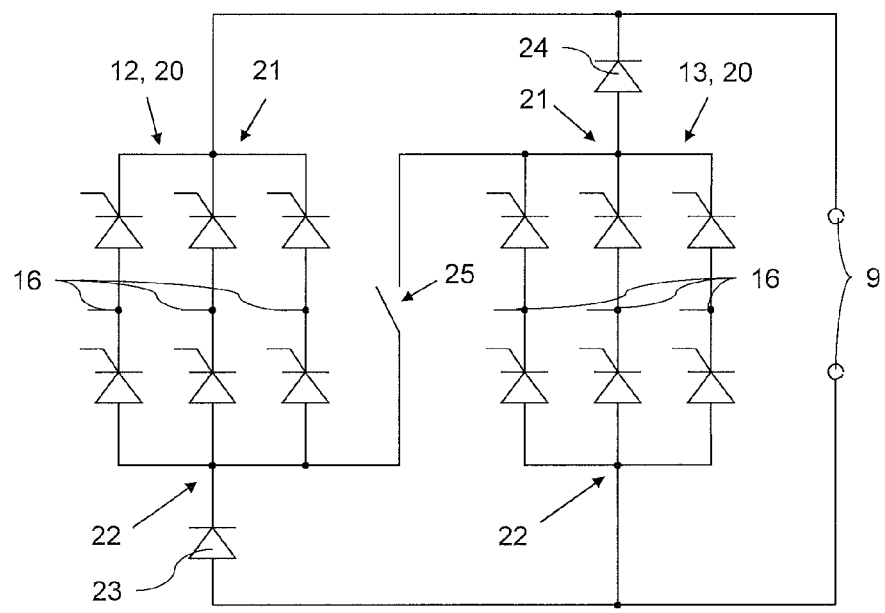
FIG. 2 shows a first rectifier and a second rectifier with a selector device of the power generation system according to the preferred embodiment of the invention in a schematic view.

FIG. 2 shows an exemplary embodiment of the first rectifier 12, the second rectifier 13 and the selector device 18. Both the first rectifier 12 and the second rectifier 13 are provided as a three-phase thyristor bridge rectifier 20. While not shown, a plurality of three-phase thyristor bridge rectifiers 20 connected in series and/or in parallel can be provided as the first rectifier 12 respectively the second rectifier 13. Each DC side 15 comprises a first line 21 on a first potential respectively on a positive potential and a second line 22 on a second potential respectively on a negative potential.

The selector device 18 comprises a first diode 23, a second diode 24 and a switch 25. The switch 25 is arranged between the second line 22 of the first rectifier 12 and the first line 21 of the second rectifier 13. The second line 22 of the first rectifier 12 is further connected via the first diode 23 arranged in blocking direction with the second line 22 of the second rectifier 13 to the exciter 9. Furthermore, the first line 21 of the second rectifier 13 is connected via the second diode 24 arranged in forward direction with the first line 21 of the first rectifier to the exciter 9.

In such way, during normal operation, the switch 25 is open and at least one converter, i.e. at least the first rectifier 12 or the second rectifier 13 is in operation and provides a DC current to the exciter 9. Specifically, in case the first rectifier 12 is used for providing DC current respectively DC power to the exciter 9, the second rectifier 13 can be used to share the DC current or as a backup units. However, during a LVRT condition the switch 25 can be closed and the first diode 23 and the second diode 24 go into a block state such that the DC voltage provided to the exciter 9 increases.

The switch 25 can be provided, for example as a mechanical breaker or as a semiconductor switch, for example as an IGBT. In an alternative embodiment the first diode 23 and the second diode 24 can be bypassed and/or replaced by a breaker 23, 24 for reducing conduction losses during normal operation.

A firing angle of any or each of the three-phase thyristor-bridge rectifiers 20 can be adjustable. For example, a common firing angle for each of the transistors in the three-phase thyristor bridge rectifier (20) on the left-hand side in FIG. 2 may be set to a first angle, and another common firing angle for each of the transistors in the three-phase thyristor bridge rectifier 20 on the right-hand side in FIG. 2 may be set to a second angle. The first angle can be adjusted independent from the second angle to achieve a split ratio of the rectifiers 20 corresponding to a ratio of the first angle to the second angle. Likewise, in configurations having more than two rectifiers, the respective firing angles may be adjusted independent from each other in a comparably manner.

FIG. 3 and FIG. 4 show two further embodiments, each comprising an additional second step-down transformer 26, but otherwise identical as the embodiment shown in FIG. 1. In the embodiment shown in FIG. 3 the second step-down transformer 26 is connected in series between the AC side 14 of the second rectifier 13 and the step-up transformer 2. In an analogous manner, the first step-down transformer 16 is connected in series between the AC side 14 of the first rectifier 12 and the step-up transformer 2 such that the first step-down transformer 16 and the first rectifier 12 on one side and the second step-down transformer 26 and the second rectifier 13 on the other side are connected in parallel between the step-up transformer 2 respectively the generator 3 and the selector device 18. In this way, an individual transformer 16, 26 is associated to each rectifier converter 12, 13.

In the embodiment shown in FIG. 4 the first step-down transformer 16 connects the second rectifier 13 to the step-up transformer 2. The second step-down transformer 26 is connected in series with the first step-down transformer 16 between the first rectifier 12 and the step-up transformer 2. In this embodiment the second step-down transformer 26 provides galvanic isolation between the first rectifier 12 and the second rectifier 13.

Figure 5:
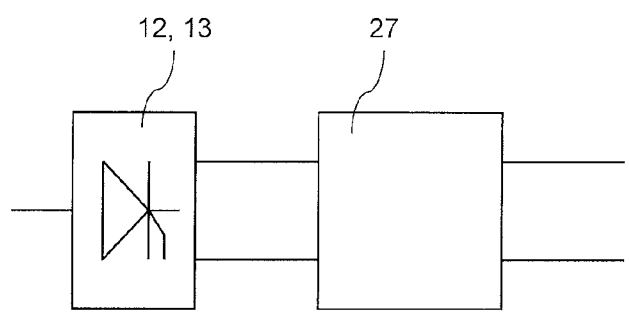
FIG. 5 shows the first rectifier in a further preferred embodiment of the invention in a schematic view.

FIG. 5 shows an embodiment of the first rectifier 12 and/or the second rectifier 13 comprising a storage element 27 connected in series with the respective first rectifier 12 and/or the respective second rectifier 13. The storage element can be provided, for example as a battery or a capacitor connected in series with a respective thyristor bridge.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these mea-

REFERENCE SIGNS LIST 1 grid
2 step-up transformer
3 synchronous generator
4 rotor
5 stator
6 primary mover
7 governor
8 field winding
9 exciter
10 main machine
11 brushless rotor
12 first rectifier
13 second rectifier
14 DC side
15 AC side
16 first step-down transformer
17 input side
18 selector device
19 output side
20 three-phase thyristor bridge rectifier
21 first potential
22 second potential
23 first diode, first breaker
24 second diode, second breaker
25 switch
26 second step-down transformer
27 storage device

The invention claimed is:

1. A power generation system, comprising a synchronous generator for converting mechanical power into electrical power provided at an output side configured for connecting to an AC power grid,
at least two rectifiers including a first rectifier and a second rectifier each having an AC side connected to the output side of the generator and a DC side,
an exciter configured for exciting the generator, and
a selector device having an input side and an output side, the input side connected to the DC sides of the at least two rectifiers and the output side connected to the exciter, wherein
the selector device is configured for switching the DC sides in series or in parallel, or for transmitting DC power from the at least two rectifiers corresponding to an arbitrary split ratio to the output side.

2. A power generation system according to claim 1, comprising
a step-up transformer connected to the output side of the generator and configured for connecting the AC power grid such that the step-up transformer is connected in series between the generator and the grid, and
a first step-down transformer connected in series between the AC sides of the at least two rectifiers and the step-up transformer,
a first step-down transformer connected in series between the AC side of at least one of the at least two rectifiers and the step-up transformer and a second step-down transformer connected in series between the AC side of the at least another one of the at least two second rectifiers and the step-up transformer, or
a first step-down transformer connected in series between the AC side of at least one of the at least two rectifiers and the step-up transformer and a second step-down transformer connected in series between the AC sides of the at least two rectifiers.

3. The power generating system according to claim 2, wherein first step-down transformer is provided with or without a phase shift scheme and/or comprises a delta-Y connection.

4. The power generating system according to claim 3, which further comprises a second step-down transformer the second step-down transformer is provided as a single transformer with isolated secondary windings.

5. The power generating system according to claim 4, wherein at least one of the at least two rectifiers is provided as a thyristor bridge rectifier, further comprise a storage device connected in series with at least one of the at least two rectifiers, and/or are galvanically isolated from each other.

6. The power generating system according to claim 2, wherein at least one of the at least two rectifiers is provided as a thyristor bridge rectifier, further comprise a storage device connected in series with at least one of the at least two rectifiers, and/or are galvanically isolated from each other.

7. The power generating system according to claim 2, wherein at least one of the at least two first rectifiers comprise a plurality of three-phase thyristor bridge rectifiers connected in series and/or in parallel.

8. The power generating system according to claim 1, wherein at least one of the at least two rectifiers is provided as a thyristor bridge rectifier, comprise a storage device connected in series with at least one of the at least two rectifiers, and/or are galvanically isolated from each other.

9. The power generating system according to claim 1, wherein at least one of the at least two first rectifiers comprise a plurality of three-phase thyristor bridge rectifiers connected in series and/or in parallel.

10. The power generating system according to claim 1, wherein
the at least two rectifiers are each provided as a three-phase thyristor bridge rectifier,
each DC side comprises a first line on a first potential and a second line on a second potential, wherein the second potential is lower than the first potential,
the selector device comprises a switch arranged between the second line of the first rectifier and the first line of the second rectifier, and
the second line of the first rectifier is connected with the second line of the second rectifier to the exciter and the first line of the second rectifier is connected with the first line of the first rectifier to the exciter.

11. The power generating system according to claim 10, wherein the selector device comprises a first diode and a second diode, and the second line of the first rectifier is connected via the first diode arranged in blocking direction with the second line of the second rectifier to the exciter and the first line of the second rectifier is connected via the second diode arranged in forward direction with the first line of the first rectifier to the exciter.

12. The power generating system according to claim 10, wherein the selector device comprises a first breaker and a second breaker, and the second line of the first rectifier is connected via the first breaker with the second line of the second rectifier to the exciter and the first line of the second rectifier is connected via the second breaker with the first line of the first rectifier to the exciter.

13. The power generating system according to claim 10, wherein the switch is provided as an electric switch, a mechanical switch, a mechanical breaker, and/or a semiconductor switch.

14. The power generating system according to claim 13, wherein the generator comprises a main machine and the exciter comprises a field wound or brushless rotor for exciting the main machine.

15. The power generating system according to claim 1, wherein the generator comprises a main machine and the exciter comprises a field wound or brushless rotor for exciting the main machine.

16. The power generating system according to claim 1, wherein the generator comprises a field winding and the exciter which is configured for exciting the generator by feeding the field winding with DC power.

17. The power generating system according to claim 1, wherein the generator comprises a rotor, a stator and a primary mover rotating the rotor, the step-down transformer is connected to the stator and the power generating system comprises a governor connected to the generator and configured for controlling mechanical power of the primary mover.

18. The power generating system according to claim 1, whereby the selector device is configured for exchanging power from the first rectifier and the second rectifier corresponding to the split ratio to the output side and the split ratio is 1:3.

19. A method of extending operating duration of a power generation system, the method comprising:
providing a synchronous generator for converting mechanical power into electrical power provided at an output side configured for connecting to an AC power grid,
providing at least two rectifiers comprising a first rectifier and a second rectifier each having an AC side connected to the output side of the generator and a DC side,
providing an exciter configured for exciting the generator,
providing a selector device having an input side and an output side, the input side connected to the DC sides of the at least two rectifiers and the output side connected to the exciter, and
switching, by the selector device, the DC sides in series or in parallel, or for transmitting DC power from the at least two rectifiers corresponding to an arbitrary split ratio to the output side.

20. The method according to claim 19, further comprising
a step-up transformer connected to the output side of the generator and configured for connecting to the power grid such that the step-up transformer is connected in series between the generator and the grid, and
a first step-down transformer connected in series between the AC sides of the at least two rectifiers and the step-up transformer,
a first step-down transformer connected in series between the AC side of the first rectifier and the step-up transformer and a second step-down transformer connected in series between the AC side of the second rectifier and the step-up transformer, or
a first step-down transformer connected in series between the AC side of at least one of the at least two rectifiers and the step-up transformer and a second step-down transformer connected in series between the AC sides of the at least two rectifiers.

\* \* \* \* \*